(12) United States Patent
Crowell et al.

(10) Patent No.: US 7,330,129 B2
(45) Date of Patent: *Feb. 12, 2008

(54) SYSTEM AND METHOD FOR DATA RETRIEVAL IN AC POWER TOOLS VIA AN AC LINE CORD

(75) Inventors: Brian R Crowell, York, PA (US); Daniele C Brotto, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 666 days.

This patent is subject to a terminal disclaimer.

(21) Appl. No.: 10/822,349

(22) Filed: Apr. 9, 2004

(65) Prior Publication Data

US 2005/0011655 A1   Jan. 20, 2005

Related U.S. Application Data

(63) Continuation-in-part of application No. 10/620,586, filed on Jul. 16, 2003, now Pat. No. 7,054,696.

(51) Int. Cl.
*G08B 5/00* (2006.01)
*G08B 5/36* (2006.01)
*G05B 11/01* (2006.01)

(52) U.S. Cl. ............... 340/815.4; 340/815.5; 340/310.11; 340/310.12; 318/479

(58) Field of Classification Search ......... 340/815.4, 340/815.5, 310.11, 310.12, 310.16, 310.18; 318/479, 490, 778; 700/7, 53, 39; 173/1, 173/2, 176
See application file for complete search history.

(56) References Cited

U.S. PATENT DOCUMENTS 4,162,527 A   7/1979   Kilbane et al.
4,194,178 A   3/1980   Dumbeck
4,263,647 A   4/1981   Merrell et al.
4,351,029 A   9/1982   Maxey et al.
4,410,846 A   10/1983  Gerber et al.

(Continued)

FOREIGN PATENT DOCUMENTS

DE          33 12 600 A1   10/1984

(Continued)

*Primary Examiner*—Brian Zimmerman
*Assistant Examiner*—Nam Nguyen
(74) *Attorney, Agent, or Firm*—Harness, Dickey & Pierce, P.L.C.

(57) ABSTRACT

An apparatus and method for obtaining data stored in an electronic module within a power tool over a power line cord of the tool, and without any disassembly of the tool being required. An interface subsystem applies a high frequency, low power AC input signal to the power cord of the tool. A controller within the tool recognizes this signal as an indication that the tool is to be placed in a communications mode. The controller modulates a power switching device used for turning on and off the motor of the tool in such a fashion that current pulses are transmitted over the power line cord back to the interface subsystem. The current pulses correspond to tool usage/performance/identification information stored in the electronic module of the tool. This information is interpreted by a current reader circuit of the interface subsystem as binary information which is then transmitted to an external computing device for analysis and/or recording.

48 Claims, 7 Drawing Sheets

U.S. PATENT DOCUMENTS

| | | | |
|---|---|---|---|
| 4,418,333 A | 11/1983 | Schwarzbach et al. | |
| 4,513,381 A | 4/1985 | Houser, Jr. et al. | |
| 4,628,459 A | 12/1986 | Shinohara et al. | |
| 4,636,961 A | 1/1987 | Bauer | |
| 4,665,399 A | 5/1987 | Fauser et al. | |
| 4,714,912 A | 12/1987 | Roberts et al. | |
| 4,771,399 A * | 9/1988 | Snowden et al. | 365/226 |
| 4,809,200 A | 2/1989 | Moore et al. | |
| 4,854,786 A | 8/1989 | Alexander et al. | |
| 4,910,753 A | 3/1990 | Wakatsuki et al. | |
| 5,051,720 A | 9/1991 | Kittirutsunetorn | |
| 5,323,325 A | 6/1994 | Izumiya | |
| 5,416,399 A | 5/1995 | Brunson | |
| 5,504,864 A | 4/1996 | Berg | |
| 5,568,033 A | 10/1996 | Brunson | |
| 5,581,229 A | 12/1996 | Hunt | |
| 5,587,931 A | 12/1996 | Jones et al. | |
| 5,710,712 A | 1/1998 | Labun | |
| 5,875,420 A | 2/1999 | Piety et al. | |
| 5,903,462 A | 5/1999 | Wagner et al. | |
| 5,981,905 A | 11/1999 | Ohmi et al. | |
| 6,005,489 A | 12/1999 | Siegle et al. | |
| 6,021,360 A | 2/2000 | Barker et al. | |
| 6,202,002 B1 | 3/2001 | Fainstein et al. | |
| 6,218,806 B1 | 4/2001 | Brotto et al. | |
| 6,260,427 B1 | 7/2001 | Jones et al. | |
| 6,308,138 B1 | 10/2001 | Jones et al. | |
| 6,326,884 B1 | 12/2001 | Wohlrabe | |
| 6,343,649 B1 | 2/2002 | Beck et al. | |
| 6,359,569 B2 | 3/2002 | Beck et al. | |
| 6,369,472 B1 | 4/2002 | Grimm et al. | |
| 6,390,205 B2 | 5/2002 | Wallgren et al. | |
| 6,570,493 B1 | 5/2003 | Rotem | |
| 6,950,010 B2 * | 9/2005 | Aisa | 340/310.16 |
| 2001/0010455 A1 | 8/2001 | Brotto et al. | |
| 2002/0144832 A1 | 10/2002 | Brandstrom et al. | |

FOREIGN PATENT DOCUMENTS

| | | |
|---|---|---|
| DE | 34 17 455 A1 | 11/1985 |
| DE | 37 44 733 C2 | 9/1989 |
| DE | 41 19 094 A1 | 1/1993 |
| DE | 42 04 237 A1 | 8/1993 |
| DE | 43 12 161 A1 | 10/1994 |
| DE | 44 02 236 C2 | 9/1996 |
| DE | 195 37 280 A1 | 4/1997 |
| DE | 196 12 089 A1 | 10/1997 |
| DE | 196 06 719 C2 | 12/1997 |
| DE | 197 13 686 A1 | 10/1998 |
| DE | 198 24 169 A1 | 12/1999 |
| DE | 100 24 221 C1 | 7/2001 |
| DE | 100 13 023 A1 | 9/2001 |
| DE | 100 14 183 A1 | 10/2001 |
| DE | 200 07 904 U1 | 10/2001 |
| DE | 100 29 133 A1 | 1/2002 |
| DE | 100 29 138 A1 | 1/2002 |
| EP | 0 119 928 A1 | 9/1984 |
| EP | 0 148 458 A2 | 7/1985 |
| EP | 0 148 458 B1 | 9/1992 |
| EP | 1 043 107 A2 | 10/2000 |
| FR | 2 599 877 | 12/1987 |
| GB | 2 352 376 | 1/2001 |
| JP | 02246656 | 4/1992 |
| JP | 07-240705 | 6/1995 |
| JP | 08141927 A | 6/1996 |
| JP | 10305366 A | 11/1998 |
| JP | 11129164 A | 5/1999 |
| WO | WO 96/06479 | 2/1996 |

* cited by examiner

SYSTEM AND METHOD FOR DATA RETRIEVAL IN AC POWER TOOLS VIA AN AC LINE CORD

CROSS-REFERENCE TO RELATED APPLICATIONS

This application is a Continuation-In-Part of U.S. patent application Ser. No. 10/620,586 filed on Jul. 16, 2003 now U.S. Pat. No. 7,054,696. The disclosure of the above application is incorporated herein by reference.

FIELD OF THE INVENTION

This invention relates to electrically driven power tools and more particularly to an apparatus and method for communicating information over a power line cord of a power tool between an electronic module disposed within the tool and an external device, to thus obtain data concerning the power tool without physically disassembling the power tool.

BACKGROUND OF THE INVENTION

With present day power tools, it would be highly desirable to provide some means for obtaining usage and other pertinent information concerning the operation of the tool without the need for disassembling a housing of the tool or otherwise mechanically accessing interior portions of the tool. Present day electronic components, such as controller/memory modules, are sufficiently small such that they can be easily housed within the housings of various types of power tools such as drills, saws, sanders, etc. A system and/or method which allows an external device to communicate over a power cord of the power tool with an electronic module mounted within a housing of the tool to obtain usage and/or operating information concerning the power tool would be highly advantageous. Such a system would eliminate the need for a service technician to disassemble the tool to gain access to the electronic module. It would allow manufacturers to quickly and easily obtain highly pertinent operating and usage information recorded by the electronic module. It would further eliminate the need to include a port somewhere on the housing, which is something that is not easily accomplished on small, hand held power tools such as drills, hand held sanders, etc.

SUMMARY OF THE INVENTION

The present invention is directed to an apparatus and method for using an external device to communicate over a power cord of a power tool with an electronic module mounted within the power tool. In one preferred form, the electronic module is adapted to communicate with a controller disposed inside the power tool which recognizes signals communicated over the power line of the tool that indicate that the power tool is to be placed in a communication mode.

The apparatus of the present invention includes an external interface subsystem which is coupled to a computing device, such as a personal computer or laptop computer, and also to the power cord of the power tool. The interface subsystem is further coupled to, or contains, an AC power source. The interface subsystem generates an AC signal that has a different frequency and/or magnitude than a standard AC mains signal, which is applied to the power cord of the tool. The controller recognizes this signal as an indication that the power tool is to be placed in a communication mode. The power tool communicates information from its control module by modulating a switching device used to switch on and off the motor of the power tool. Modulating the switching device causes current pulses to be produced on the power cord that are sensed by a current reading circuit of the interface subsystem. The controller within the power tool is also synchronized to the frequency of the signal applied by the interface subsystem to the power cord of the tool. The controller modulates the switching device to produce a series of current pulses over the power cord that are synchronized with the input signal applied to the power cord. These current pulses form coded information, in one preferred form binary information, indicative of various types of usage or operational information recorded by the control module. These current pulses are sensed by the current reader circuit of the interface subsystem. The interface subsystem extrapolates this usage/operational information from the coded information and transmits the usage/operational information to an external device. In one implementation the external device may comprise a computing device such as a personal computer, a laptop computer or some other computing apparatus.

In an alternative preferred embodiment, the interface subsystem places a low power DC signal on the power cord of the power tool as an input signal. The controller within the power tool recognizes the presence of this DC signal and interprets it as a command to place the power tool in a communications mode. The controller then modulates the internal switching device of the power tool as needed to produce the current pulses which represent coded signals indicative of the stored contents of the control module. These current pulses are then decoded by the interface subsystem and the decoded information is transmitted to a suitable computing or data logging device.

The electronic module disposed in the power tool can be used to record and provide information to the external interface subsystem concerning the hours of use of the tool, serial number or user information related to the power tool, or any other valuable performance/operational data associated with the power tool. It is a principal advantage of the present invention that the power tool does not need to be disassembled to gain access to the control module to obtain the information stored within it. By applying an appropriate signal over the power cord of the power tool and using the controller associated with the power tool to modulate a switching component within the tool, signals can be sent over the tool's power cord that represent stored information from the tool's control module. Importantly, the input signal from the interface subsystem is recognized by the power tool's controller as a command that the tool be placed in a communicating mode. In the communications mode, the switching action of the switching component is such that the electric motor of the power tool cannot be energized to a sufficient extent to cause operation of the motor while data from the control module is being downloaded. An additional benefit is that the present invention does not require the use of a separate interface connector to be included on the housing.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
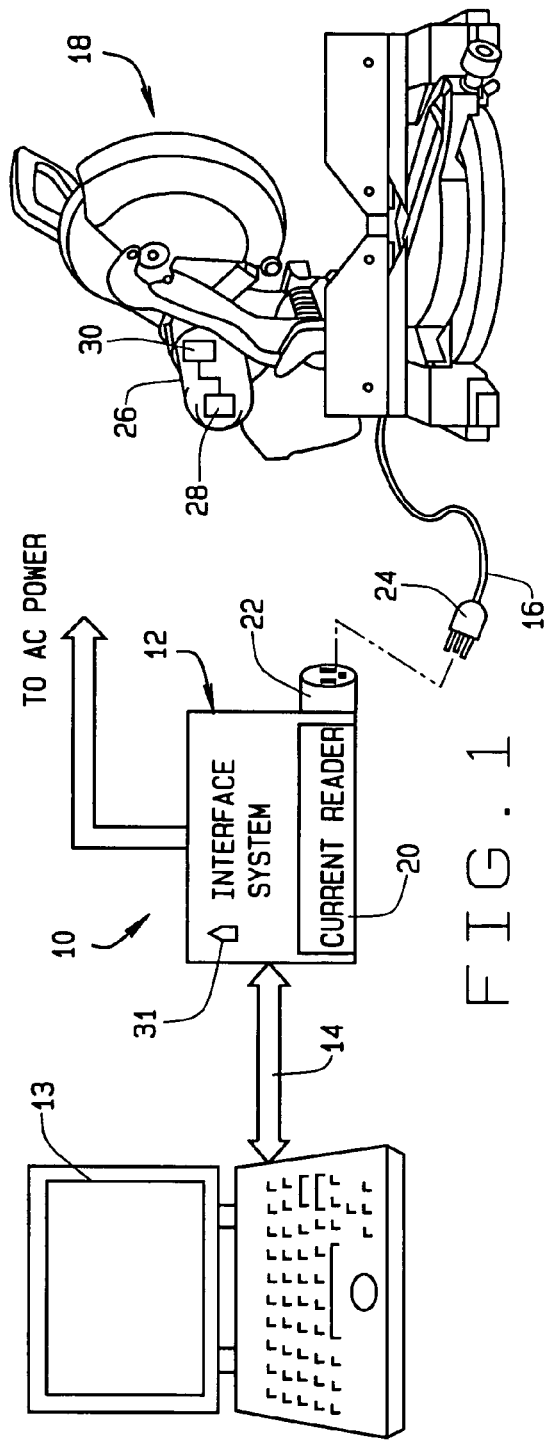
FIG. 1 is a simplified block diagram of the overall system of the present invention communicating with a laptop computer and a power cord of a power tool, and where the power tool is illustrated as a miter saw.
Figure 2:
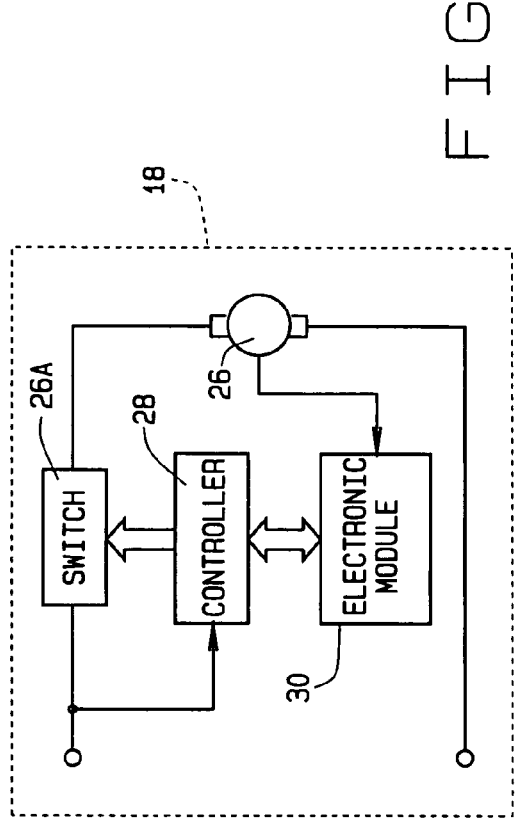
FIG. 2 is a simplified block diagram of the coupling of the electronic control module to the controller of the power tool and to the motor of the tool.

Referring to FIG. 1, there is shown a system 10 in accordance with a preferred embodiment of the present invention. The system 10 includes an interface subsystem 12 that is coupled to an AC power source. In an alternative preferred form, the interface system 12 includes a AC power source. For example, the AC power source can be a standard 100/120 VAC or 230 VAC 50/60 Hz AC power source. The interface subsystem 12 is further coupled to a computing device 13 or other suitable electronic device via a suitable communications cable 14, and to a power cord 16 of an electrically driven power tool 18. The interface subsystem 12 includes a current reader circuit 20 that will be described in greater detail in the following paragraphs, and an electrical receptacle 22 for electrically connecting with a plug 24 of the power cord 16. The power cord 16 can be connected to the interface subsystem 12 by directly connecting the plug 24 to the receptacle 22, or alternatively, by using an adapter (not shown) connected between the plug 24 and the receptacle 22. The adapter would allow all types of tool power cord plugs 24 to be electrically connected to the interface subsystem 12. For example, if the receptacle 22 is a standard polarized receptacle commonly used in the United States, the adapter would allow a non-polarized plug 24 commonly used in Europe to be electrically connected to the interface subsystem 12. To communicate with the computing device, the interface subsystem 12 additionally includes dedicated hardware and firmware to allow processing and formatting or tool data to a standard PC type serial communications protocol.

The power tool 18 includes a motor 26 which is controlled by a power switching device 26a that is controlled by a controller 28. The power switching device 26a can be any suitable power switching device such as a triac, thyristor, a field effect transistor (FET), an insulated gate bipolar transistor (IGBT), a silicone-controlled rectifier (SCR), or any other voltage control device. The controller 28 is also in communication with an electronic module 30 housed within the tool 18. In actual practice, the controller 28, switch 26a and the electronic module 30 could be provided by a single electronic component.

The electronic module 30 is used to store usage information or any other form of data pertaining to the operation, ownership or performance of the power tool 18. It will be appreciated that the power tool interface subsystem 12 and electronic module 30 essentially comprise the additional components that form the system 10. The motor 26, switching device 26a and the controller 28 are components that are typically included with many present day power tools. In one preferred implementation, switch 26a comprises a thyristor.

When the power tool 18 is connected, directly or indirectly, to the interface subsystem 12 and the interface subsystem 12 is connected to an AC power supply, the incoming AC power provides power to the interface subsystem 12 and to the electronic module 30. In a preferred embodiment, the interface unit 12 is electrically isolated, e.g by at least 500 VAC, from the AC power source ground used to power the interface unit 12. This ensures that the tool 18 connected to the interface unit 12 does not need any special isolation requirements.

It will also be appreciated that while the power tool 18 is illustrated as a miter saw, the present invention could be used with virtually any form of electrically driven power tool. Accordingly, drills, sanders, grinders, other forms of power saws, routers, joiners, etc. could be used with the present invention. The present invention could also be employed with outdoor products such as lawn mowers, blade and string trimmers, edgers, hedge trimmers, etc.

Furthermore, the interface subsystem 12 includes an AC bypass control 31. The bypass control 31 allows the tool 18 to be powered by communications electronics of the interface subsystem 12 for programming and data reading or by the AC power source for normal operation of the tool 18. In a preferred embodiment, the bypass control 31 is a control relay having an isolated change-over contact with a normally open and normally closed contact connected to a 3-pin PCB mounted terminal block. The isolation voltage is at least approximately 400-600 VAC from the relay coil to the relay contacts and the contacts are rated for at least approximately 240-260 VAC, with approximately 1-3 amp switching. The relay contacts allow external switching, via a suitable contactor/power relay, of the tool 18 directly to the AC power source or the output, i.e. receptacle 22, of the interface subsystem 12.

In general operation, the interface subsystem 12 is coupled to the computing device 13 and to the power tool 18 when it is desired to download stored information from or send information to the electronic module 30. Interface subsystem 12 operates to apply a low power, high frequency input signal over the power line cord 16. The controller 28 recognizes this low power, high frequency signal as a command that the power tool 18 is to be placed in a communications mode, where information can be uploaded to and stored in the electronic module 30, and/or downloaded from the electronic module 30 to the interface subsystem 12. The transmission of data between the electronic module 30 and the interface subsystem 12 is controlled by a set protocol. The voltage and/or frequency of the input signal applied to the power cord 16 is sufficiently different from a standard AC mains voltage such that the controller 28 immediately recognizes it as a command to enter the communications mode. The input signal is sufficiently low in magnitude and/or high enough in frequency that it does not cause the motor 26 of the power tool 18 to actually start rotating during the communication process with the interface subsystem 12. In one preferred form, the input signal comprises a 96 volt, 100 Hz AC signal.

In a preferred form, the communication protocol is a substantially complex protocol that substantially reduces the risk of intentional and/or unintentional corruption of the data stored in the electronic module 30. That is, the complexity of the communication protocol substantially ensures that data stored in the electronic module 30 can not be read or altered by unauthorized users. The protocol requires that a specific sequence of characters be sent by the interface subsystem 12 to the electronic module 30 with a specific timing in order for communication between the interface subsystem 12 and the electronic module 30 to occur. This combination of characters and timing is sufficient to prevent "hacking" of the electronic module 30. Thus, data stored in the electronic module 30, i.e. power tool user information, is maintained in a safe and secure manner.

The controller 28 of the power tool 18 is further synchronized to the high frequency AC input signal. In a preferred embodiment the controller 28 monitors incoming signals for a valid data-retrieval command signal, and then proceeds to pulse switching device 26a accordingly. The power switching device 26a is turned on during positive and/or negative cycles of the input signal. In one preferred embodiment a turn on, allowing current flow, would indicate a binary high (logic '1') level signal, while the absence of a current pulse during any cycle of the input signal signifies a logic '0' level signal. More specifically, in one preferred embodiment switch 26a is turned on during the negative half cycle to indicate a binary '1' and turned off to indicate a binary '0'. Alternatively, reverse logic could be utilized wherein current flow indicates a binary '0', and the absence of current indicates a binary '1'.

The current pulses during the subsequent half cycles of the input signal are detected by the current reader circuit 20 and are interpreted accordingly. In the just mentioned preferred embodiment, a current pulse would be interpreted as a logic '1'. Thus, if a current pulse is not detected during a given positive half cycle of the signal input to the power cord 16, the current reader circuit 20 interprets this absence of a current pulse as a logic '0' level signal. In this manner, the controller 28 can control the switching device 26a so that a binary stream of data is created over the power cord 16 which represents information stored in the electronic control module 30. This information is then transmitted to the computing device 13 and stored therein and/or displayed on a display thereof.

It will be appreciated that while the controller 28 may form an existing component of the power tool, it nevertheless requires suitable programming code to be able to recognize the command signal from the interface subsystem 12. Suitable programming code is also needed to control the switching device 26a in a manner needed to produce the current pulses on the power cord line 16.

It is a principal advantage of the present invention that the power tool 18 does not need to be disassembled to gain access to the stored information in the electronic control module 30. Likewise the power tool 18 does not need to be disassembled to upload data from the interface subsystem 12 to the control module 30. In a preferred embodiment, the system 10 is a fully duplexed system that enables bidirectional communication between the power tool 18 and the interface subsystem 12. Thus, the power tool 18 need only be coupled to the interface subsystem 12, and the interface subsystem in turn coupled to the computing device 13, before the interface subsystem circuit can be used to download information from and/or upload information to the electronic control module 30. As will be appreciated, this significantly simplifies and expedites the downloading and/or uploading of the information from and/or to the electronic module 30. It also eliminates the possibility of accidental damage to other internal components of the power tool 18 or its housing which could occur if partial disassembly of the tool was required to obtain access to the internally mounted control module. It also significantly reduces the time needed to obtain usage/operational data, as compared to the time that would be required if manual disassembly of the power tool housing was required as part of the information gathering process.

Another important advantage of the present invention is that no interface connector(s) need to be integrated into the housing to permit the interface subsystem 12 to communicate with the controller 28. By using the power cord 16 to communicate with the controller 28, the need for a separate port or other form of electrical connector on the housing of the tool 18 is eliminated. This allows for greater flexibility in designing the housing so that maximum flexibility is afforded in positioning the controls of the tool 18. It also avoids the additional expense that would be incurred if a separate interface connector had to be integrated into the housing.

Figure 3:
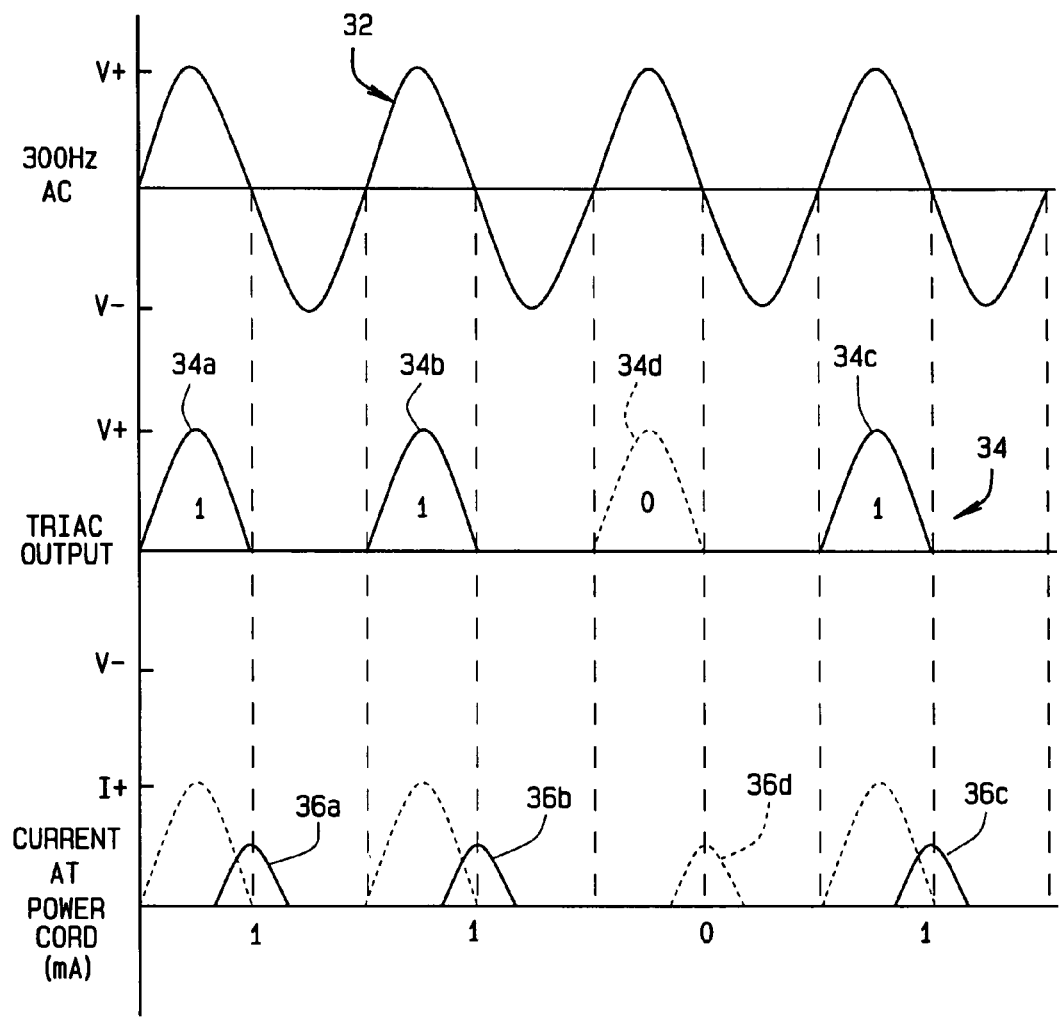
FIG. 3 is an illustration of the AC input signal waveform, the pulse train produced by the switching component within the tool, and the current pulses produced on the power cord of the tool during downloading of stored information from the electronic module located in the power tool.

Referring to FIG. 3, a typical AC input waveform 32 generated by the interface subsystem 12 is shown. The waveform is noted in FIG. 3 as a sinusoidal AC waveform which, will be appreciated, has a frequency well above the standard 60 Hz frequency of an AC mains signal used in the United States. In one preferred implementation the frequency is 100 Hz. Waveform 34 is comprised of switching pulses 34a-34c generated by the switching device 26a within the tool 18 while the tool 18 is in the communications mode. Switching pulses 34a, 34b and 34c represent logic '1' level signals. The absence of a switching pulse, indicated by a dash line 34d, represents a logic '0' level signal. It will be noted that pulses 34a-34c are synchronized to the positive half cycles of input AC waveform 32. Waveform 36 illustrates the current pulses 36a, 36b and 36c that are produced by the switching pulse 34. Collectively, the three pulses 36a-36c and the absence of a pulse designated by dashed line 36d form a binary number of "1101". It will be noted that the current pulses 36a, 36b and 36c are shifted slightly in time relative to the switch signals 34a, 34b and 34c, respectively, due to the inductance of the motor 26.

It will also be appreciated that while positive pulses are illustrated in waveform 36, the present invention is not limited to the use of only positive-going, sinusoidal pulses. Other forms of pulses such as triangle or square wave pulses may be used, as well as a combination of positive-going and negative-going pulses.

Figure 4:
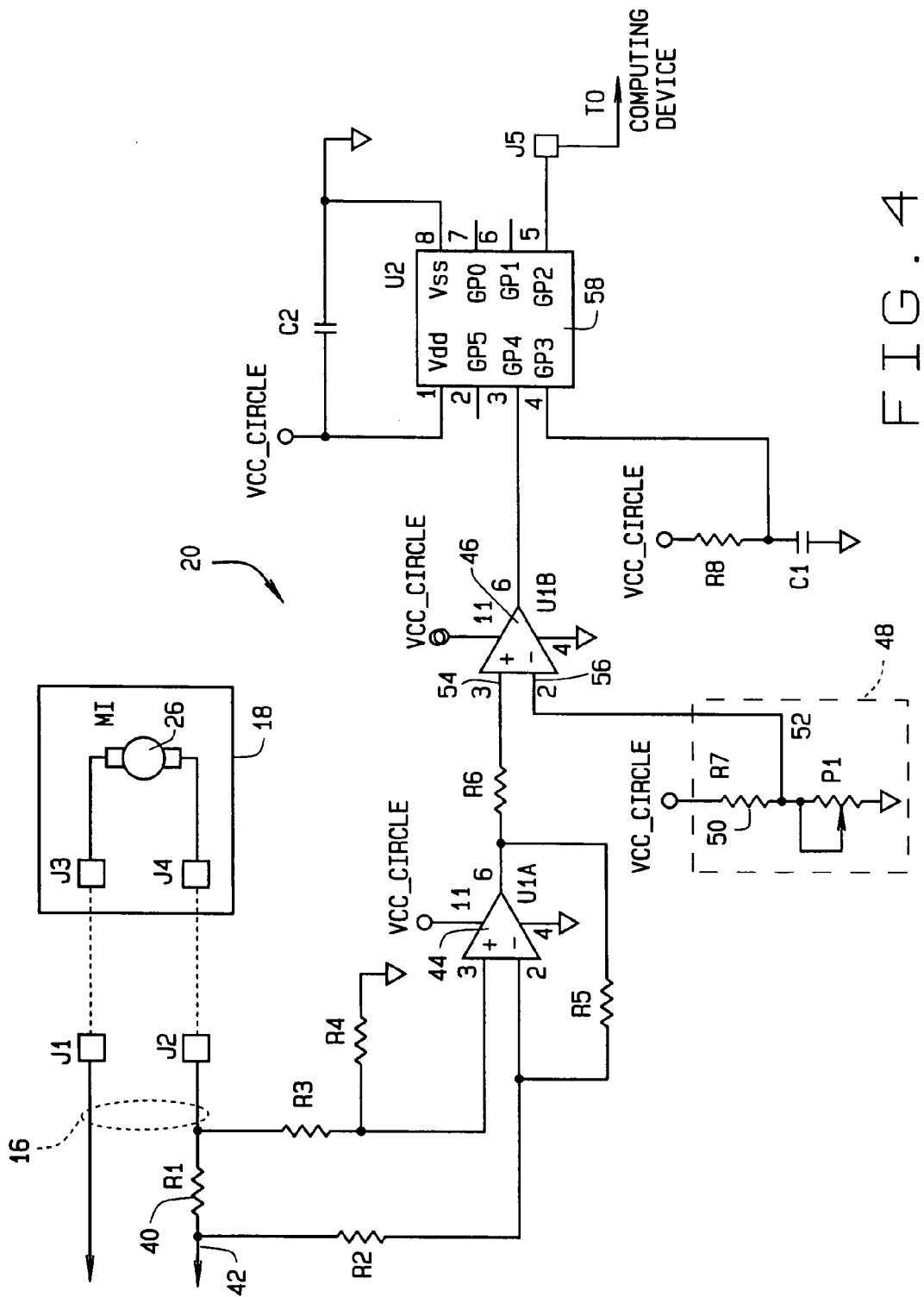
FIG. 4 is a simplified electrical schematic diagram of the current reader of the interface subsystem.

Referring now to FIG. 4, a preferred form of the current reader circuit 20 is illustrated. It will be appreciated immediately that the values for the electrical components shown in FIG. 4 are merely shown for exemplary purposes.

As explained previously, the current reader circuit 20 contains the necessary circuitry for detecting whether a current pulse exists during any half cycle of the input sine wave 32 of FIG. 3. It accomplishes this by the use of a small current shunt resistor 40 placed in series with the low side (neutral) power line 42 which couples to the power cord 16 of the power tool 18 through receptacle 22. A differential gain op-amp 44 monitors the voltage across the shunt resister 40. The op-amp 44 amplifies the voltage to a level that the remainder of the current reader circuit 20 can use. The output of the op-amp 44 is then passed to a comparator 46 that checks to see if the voltage is above a preset threshold set by a voltage divider network 48. The voltage divider network 48 is comprised of a resistor 50 and a potentiometer 52.

When the voltage at input 54 of the comparator 46 is higher than the threshold voltage on input 56, the comparator 46 sends signals to a microcontroller 58 that there is a current present at that time. The microcontroller 58 is therefore apprised of the current pulse that is present at that given instant and is also synchronized with the input sine wave 32. The microcontroller 58 checks if the comparator 46 is indicating that current is present during a positive half wave of the input sine wave 32. It is also able to determine the length of time that the current pulse is present, if necessary. From this, the microcontroller 58 records the pulses as they occur in an internal memory. When communication is finished (i.e., once 8-bits have been received), the microcontroller 58 transmits the 8-bit data at a standard baud rate and in serial fashion, to the computing device 13. It will be appreciated that the current reader circuit 20 can read and synchronize with virtually any frequency signal. Also, it will be appreciated that the values for the electrical components shown in FIG. 4 are exemplary only. Additionally, the current reader circuit 20 can detect current pulses having both a positive and negative polarity such that the power tool 18 can be connected to the interface subsystem 12 with either polarity.

Figure 5:
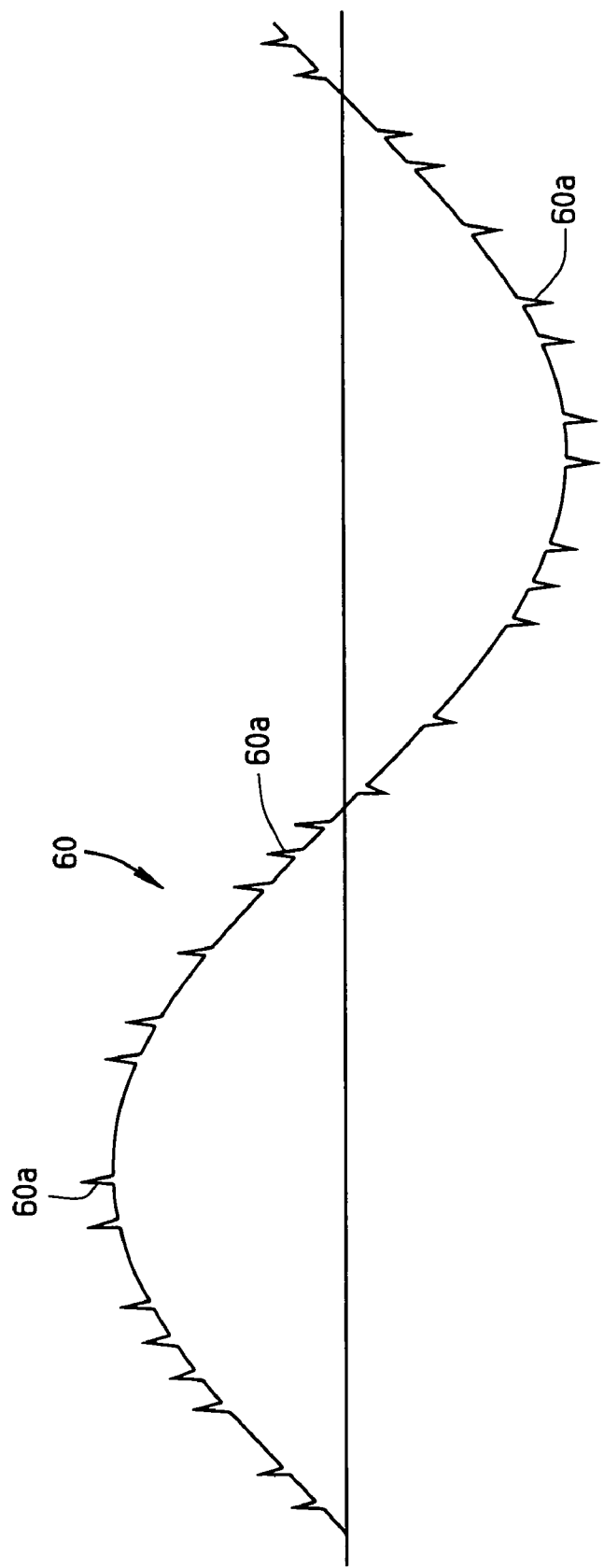
FIG. 5 is a sample waveform illustrating how current pulses could be capacitively coupled onto an input waveform to transmit data stored in the electronic control module of the power tool to the interface subsystem.

Still another method for transmitting information over the power line cord 16 could be formed by the use of capacitive coupling to the AC signal applied to the power cord 16. With reference to FIG. 5, this method causes small pulses 60a to be superimposed on the AC signal 60 being input to the power cord 16. The interface subsystem 12 monitors the pulses 60a and extracts the data as needed before transmitting the data to the computing device 13.

It will also be appreciated that while the system 10 has been described in connection with the use of an alternating current signal, that a low power DC signal could also be employed instead of the AC signal. The controller 28 can be programmed to recognize this "weak" DC current as an indication that the power tool 18 is to be placed in a communications mode. The controller 28 can then pulse the power switching device 26a of the power tool 18 to produce the coded pulse train representative of the stored information in the electronic module 30. Due to the weak DC signal, the power switching device 26a, which may comprise a thyristor or any other suitable switch, never latches. The switching device 26a can be easily and very quickly switched, thus allowing a high throughput.

Figure 6:
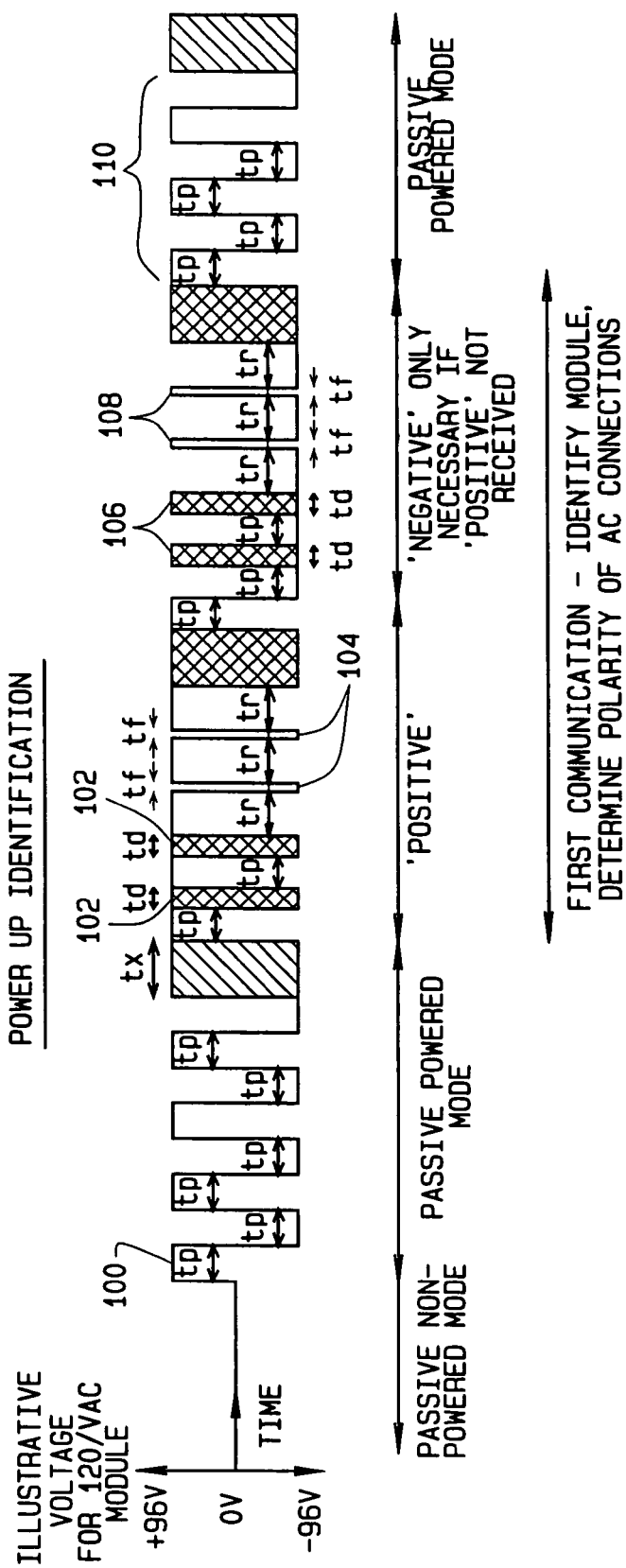
FIG. 6 is a waveform illustrating one preferred communication protocol for initiating communication with the electronic module housed with the tool.
Figure 7:
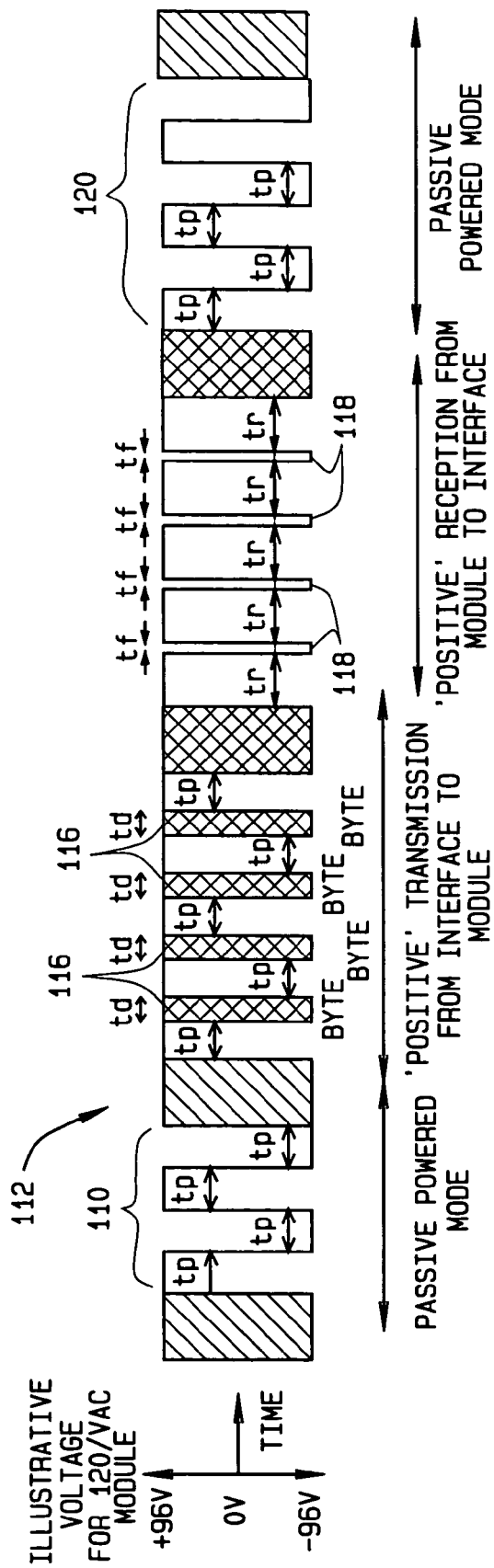
FIG. 7 is a waveform illustrating "positive" polarity communications between the interface subsystem and the electronic module housed within the tool.
Figure 8:
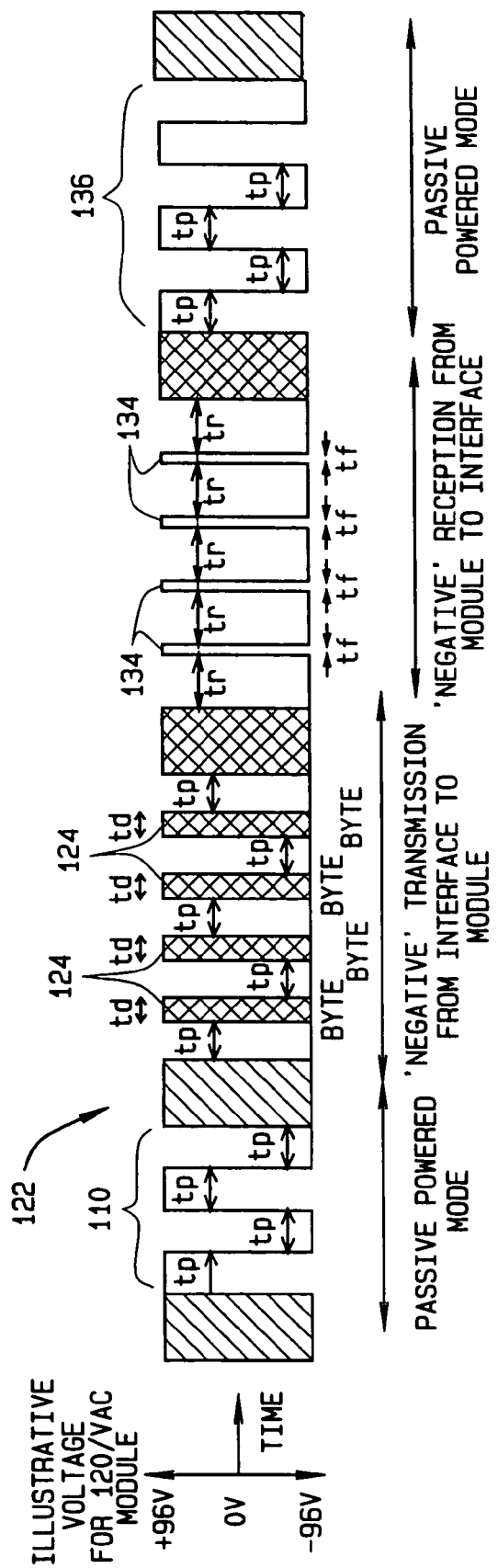
FIG. 8 is a waveform illustrating "negative" polarity communications between the interface subsystem and the electronic module.

Referring now to FIGS. 6-8 the implementation of a preferred embodiment of the present invention will be described in connection with the use of a switched, square wave, bipolar DC signal from the interface subsystem 12. In a transmission mode, data is transmitted from the interface subsystem 12 to the tool controller 28 and/or electronic module 30 by sending a switched bipolar DC voltage signal. In one embodiment the switched bipolar DC voltage signal is generated by a full H-bridge converter switch arrangement. In the transmission mode, when the voltage is positive the data is considered logic '1' and when the voltage is negative the data is considered logic '0'. In a preferred embodiment the switched bipolar DC voltage magnitude is ±96 V, i.e. 192V peak-to-peak, for a tool 18 that utilizes 120 VAC, and ±192 V, i.e. 384V peak-to-peak, for a tool 18 that utilizes 230 VAC.

In a reception mode, data is received from the electronic module 30 by the interface subsystem 12 by sensing the current flow through the electronic switch 26a. When the controller 28 turns on the electronic switch 26a during a time period tf of the switched bipolar DC voltage, the data is considered logic '0'. When the controller 28 does not turn on switch 26a during a period tf of the switched bipolar DC voltage, the data is considered logic '1'. The switch 26a is commutated off during switching supply rest periods tr of the switched bipolar DC voltage, following the conduction periods tf. During a conduction period tf the switching device 26a may or may be not be fired by the controller 28 depending on the specific bit to be transmitted during each conduction period tf. In a preferred embodiment, the switching device 26a 'on' current is sensed when the measured current is greater than approximately 100 mA, for approximately 400 μsec during the period tf. The zero current is sensed when the measured current is less than approximately 100 mA, for approximately 400 μsec, during the period tf. Additionally, in a preferred embodiment, the switching supply rest period tr of the bipolar voltage lasts for approximately 5.6 milliseconds.

Interface Unit Initiating Communications With The Tool

Whenever communication with the tool 18 is required, an initial passive powered mode of operation is used to initiate such communication. In this mode, the interface subsystem 12 simply powers the tool 18 but no actual communication of data is occurring between the tool 18 and electronic module 30. Referring to FIG. 6, in one preferred implementation a switched, bipolar DC signal 100 having a specific voltage, frequency, communications protocol and baud rate is employed to initiate communications with the electronic module 30. For example, communication can be initiated with the electronic module 30 using the bipolar DC signal 100 having a frequency of 100 Hz, a voltage of ±96 volts, a RS232 communications protocol and a baud rate of 4800 baud.

The passive powered mode includes a positive voltage for a power refresh period tp, e.g. about 5.0 milliseconds, followed by a negative voltage for another power refresh period tp, e.g. about 5.0 milliseconds. In a preferred embodiment, the duty cycle of the switched bipolar DC signal is approximately 50%. The power refresh periods tp allow interface subsystem 12 to properly power up the electronic module 30. During this passive powered mode the periods tp are maintained for a period of time, e.g. at least about 100 milliseconds, before communication can commence with the electronic module 30. This ensures that the power within the module 30 are established and stable.

Electronic module Identification and Polarity Determination

With further reference to FIG. 6, once the electronic module 30 is powered up, it is necessary to establish communication with the controller 28 and electronic module 30 and to determine the polarity the connection that the controller 28 and electronic module 30 have with the interface subsystem 12. Polarity determination is necessary to ensure that whichever way the module 30 is connected to the interface subsystem 12, communication can always occur.

It will be appreciated that, as described above, in a preferred embodiment, the electronic module 30 is in communication with the controller 28, which receives communications from the interface subsystem 12 and inputs data included in the communication to the electronic module 30. Additionally, the controller 28 controls the firing of the switching device 26a to communicate data from the electronic module 30 to the interface subsystem 12. Furthermore, in another preferred embodiment, as described above, the controller 28 and the electronic module 30 comprise a single electronic component. In the single electronic component embodiment, the electronic module 30 is likewise in communication with the controller, which likewise receives communications from the interface subsystem 12 and inputs data included in the communication to the electronic module 30. Thus, any communication between the electronic module 30 and the interface subsystem 12, as described herein, should be understood to mean communication between the interface subsystem 12 and the controller 28 that is in communication with the electronic module 30, wherein the controller 28 and electronic module 30 may or may not be included in a single electronic component.

After a transition period tx, the polarity identification process begins. In a preferred embodiment, the identification process begins with a positive polarity test, but could alternatively begin with a negative polarity test, as described below. The positive polarity test consists of sending a two character transmission during communication periods td from the interface subsystem 12 to the controller 28. The character transmissions are represented by portions 102 of waveform 100. If the polarity of the connection between the module 30 and the interface subsystem 12 is positive, the interface subsystem 12 receives back from the controller 28, during periods tf, a two character response.

The two character response is indicated by portions 104. If the polarity is determined to be positive, the system 10 would continue in a transmission mode, as described in detail below. However, if the controller 28 does not respond from this "positive" polarity identification communication, the communication is repeated but with a "negative" polarity. Therefore, the interface subsystem 12 again sends a two character transmission during periods td, as indicated by portions 106 of waveform 100. If the polarity is negative, the interface subsystem 12 receives back from the controller 28, during periods tf, a two character response. The response to the "negative" polarity communication is indicated by portions 108 of waveform 100. Once the polarity of the connection is determined, the system 10 enters the passive power mode of operation indicated by portion 110.

If no response is received from either identification communication, the interface subsystem 12 powers down the electronic module 30 and concludes that the tool 18 is not connected to the interface subsystem 12 or for whatever reason cannot communicate with the interface subsystem. However, if the electronic module 30 is connected and functioning properly, one of the two identification transmissions will establish the polarity of the connection between the electronic module 30 and the interface subsystem 12. From then on, all communications will be made with this polarity of communication.

Positive Polarity Transmission Mode of Operation

Referring to waveform 112 in FIG. 7, "positive" polarity communication is illustrated. As described above, once the polarity of the connection is determined, the system 10 enters the passive power mode of operation indicated by portion 110. After the passive power mode, the interface subsystem 12 sends a serial data request transmission to the electronic module 30. The serial data request transmission from the interface subsystem 12 to the electronic module 30 consists of consecutive data bytes 116 during the periods td. As described above, the rate of transmission of data during the periods td can be very fast, e.g. 4800 baud. Between each data byte 116 sent, the interface subsystem 12 provides a power refresh period tp of a suitable duration, for example 5.0 milliseconds. In this positive polarity scenario a logic '0' is transmitted from the interface subsystem 12 as a negative voltage, and a logic '1' is transmitted as a positive voltage.

Positive Polarity Reception Mode of Operation

After the interface subsystem 12 transmits the request, the controller 28 transmits a response by sequentially firing and/or not firing the switching device 26a during the time periods tf of a specific duration, e.g. about 5.6 milliseconds. Portions 118 indicate a response from the controller 28 back to the interface subsystem 12 during the periods tf. Between each period tf the controller 28 provides a switching device rest period tr of a specific duration, e.g. about 0.4 milliseconds. The switching device rest periods tr allow power to the controller 28 and the electronic module 30 to recover after each firing of the switching device 26a. Although FIG. 7 illustrates that during each period tf, the switching device 26a was fired driving the signal low, it should be appreciated that the controller 28 may not fire the switching device 26a, thereby keeping the signal high. Thus, the switching device 26a may or may not be fired during the periods tf. The sequential firing and/or non-firing of the switching device 26a transmits binary bits of data back to the interface subsystem 12 representative of the data and/or information requested by the interface subsystem 12. The bits transmitted make up bytes of data transmitted from the electronic module 30 to the interface subsystem 12.

For the positive polarity scenario illustrated in FIG. 7, the firing of the switching device 26a drives the signal low indicating a digital '0'. Thus, when the switching device 26a is fired, current is allowed to flow through the switching device 26a to the interface subsystem 12, which is interpreted by the interface subsystem 12 as a digital '0'. Conversely, if the switching device 26a is not fired, current is not allowed to flow and the signal remains high indicating a digital '1'. In a preferred embodiment, current through the electronic switch 26a greater than approximately 100 mA corresponds to logic '0', while current through the electronic switch 26a less than approximately 100 mA corresponds to logic '1'.

The reception mode continues until the interface subsystem 12 has received enough bits of data to match what is expected by the interface subsystem 12 from the electronic module 30. After the electronic module 30 has completed sending the requested data or information, the system 10 enters another passive powered mode 120 where no communication is occurring between the electronic module 30 and the interface subsystem 12. The interface subsystem 12 may then request other data or information, and the electronic module 30 will respond accordingly, as described above. Once all communication is complete, the output voltage applied to the tool 18 from the interface subsystem 12 is set to zero.

Negative Polarity Transmission Mode of Operation

FIG. 8 illustrates "negative" polarity communications via waveform 122. If the controller 28 and the electronic module 30 have a negative polarity with respect to the interface subsystem 12, the waveform 122 is generated. It will be appreciated that the negative waveform 122 is interpreted by the negatively polarized electronic module 30 in the same manner as the positively polarized electronic module 30 interprets the waveform 112, shown in FIG. 7. That is, the positive and negative polarity scenarios are mirror images. However, the current flowing through switching device 26a will be negative in the negative polarity scenario, as opposed to being positive in the positive polarity scenario. Thus, the voltage is interpreted by the controller 28 and electronic module 30 as the same in both scenarios, e.g. ±96 volts, but the polarity of the current will be opposite in the two scenarios.

Once the polarity of the connection is determined the system 10 enters the passive power mode of operation indicated by portion 110. As in the positive polarity scenario described above, after the passive power mode, the interface subsystem 12 sends a serial data request transmission to the electronic module 30. The serial data request transmission from the interface subsystem 12 to the electronic module 30 consists of consecutive data bytes 124 during the periods td with the power refresh periods tp between the data bytes. As described above, the rate of transmission of data during the periods td can be very fast, e.g. 4800 baud. In the negative polarity scenario a logic '0' is transmitted from the interface subsystem 12 as a positive voltage, and a logic '1' is transmitted as a negative voltage.

Negative Polarity Reception Mode of Operation

After the interface subsystem 12 transmits the request, the electronic controller 28 transmits a response by sequentially firing and/or not firing the switching device 26a during the time periods tf of a specific duration, e.g. about 5.6 milliseconds. Portions 134 indicate a response from the controller 28 back to the interface subsystem 12 during the periods tf. Between each period tf the controller 28 provides a switching device rest period tr of a specific duration, e.g. about 0.4 milliseconds. Although FIG. 8 illustrates that during each period tf, the switching device 26a was fired driving the signal high, it should be appreciated that the electronic module 26a may not fire the switching device 26a, thereby keeping the signal low. Thus, the switching device 26a may or may not be fired during the periods tf. The sequential firing and/or non-firing of the switching device 26a transmits binary bits of data back to the interface subsystem 12 representative of the data and/or information requested by the interface subsystem 12. The bits transmitted make up bytes of data transmitted from the electronic module 30 to the interface subsystem 12.

For the negative polarity scenario illustrated in FIG. 8, the firing of the switching device 26a drives the signal high indicating a digital '0'. Thus, when the switching device 26a is fired, current is allowed to flow through the switching device 26a to the interface subsystem 12, which is interpreted by the interface subsystem 12 as a digital '0'. Conversely, if the switching device 26a is not fired, current is not allowed to flow and the signal remains low indicating a digital '1'. In a preferred embodiment, current through the electronic switch 26a greater than approximately 100 mA corresponds to logic '0', while current through the electronic switch 26a less than about 100 mA corresponds to logic '1'.

The reception mode continues until the interface subsystem 12 has received enough bits of data to match what is expected by the interface subsystem 12 from the electronic module 30. After the electronic module 30 has completed sending the requested data or information, the system 10 enters another passive powered mode 136 where no communication is occurring between the electronic module 30 and the interface subsystem 12. The interface subsystem 12 may then request other data or information, and the electronic module 30 will respond accordingly, as described above. Once all communication is complete, the output voltage applied to the tool 18 from the interface subsystem 12 is set to zero.

It should be emphasized that each of the preferred methods for transmitting information from the electronic module 30 over the power cord 16 to the system 10 involve the application of an input signal which is of sufficiently low power (or of a predetermined frequency) that the controller 28 will not pulse the switching device 26a in a manner sufficient to cause the motor 26 to actually start to turn. Thus, the information from the electronic module 30 can be downloaded through the power cord 16 without risk of the tool 18 turning on during this process.

The present invention thus forms a convenient means for obtaining information stored in an electronic module disposed within a power tool and in a manner which does not require any disassembly of the power tool. In this manner, a variety of useful information/data concerning the performance, characteristics, identification or other data of the tool can be quickly accessed and recorded on a computer or other data logging device.

What is claimed is:

1. A system for communicating information between a power tool and an independent subsystem using a power cord of the tool as a signal conducting medium, the system comprising:
   an independent interface subsystem adapted to be electrically coupled to said power cord for bidirectional communication with said power tool via said power cord, and to provide an input signal to said power tool to initiate communication with said power tool;
   an electronic module disposed within said tool for storing operational information relating to said power tool;
   a controller disposed within said tool and in communication with said electronic module, said controller is adapted to:
      recognize said input signal and thereafter enter a communications mode of operation;
      obtain said operational information from said electronic module; and
      transmit periodic pulses representative of said operational information over said power cord in synchronization with said input signal; and
   wherein said interface system decodes said periodic pulses to obtain said operational information.

2. The system of claim 1, wherein:
   said periodic pulses comprise current pulses; and
   wherein said independent interface subsystem comprises a current reading subsystem for reading said periodic pulses and demodulating said periodic pulses.

3. The system of claim 1, wherein said interface subsystem comprises a computing device.

4. The system of claim 1, wherein said input signal comprises an AC input signal having a frequency of approximately 100-300 Hz.

5. The system of claim 4, wherein said periodic pulses comprise pulses that are synchronized in frequency with said AC input signal.

6. The system of claim 5, wherein said periodic pulses are synchronized with positive going portions of said AC input signal.

7. The system of claim 1, wherein said periodic pulses comprise a DC input signal.

8. The system of claim 1, wherein said periodic pulses are capacitively coupled onto said AC input signal.

9. The system of claim 1, wherein said interface system is further adapted to transmit a data signal to said controller, the data signal representative of data to be stored in said electronic module.

10. The system of claim 9, wherein said controller further adapted to interpret the data signal and store the data in said electronic module.

11. A system for communicating information between a power tool having a power cord, an internal motor, a switch in communication with said power cord for switching on and off said motor, and a storage module for storing operational information relating to said tool, the system comprising:
- an independent interface subsystem adapted to be electrically coupled to said power cord for facilitating bi-directional communications with said power tool, via said power cord;
- said independent interface subsystem operating to initiate a communications mode between said power tool and said interface subsystem by applying to the power cord an AC input signal having a frequency greater than 60 Hz and being of insufficient magnitude to cause rotation of said motor; and
- a controller disposed within said tool for recognizing said AC input signal and transmitting signal pulses, via said switch, corresponding to said stored operational information over said power cord back to said interface subsystem for decoding by said interface subsystem.

12. The system of claim 11, wherein said signal pulses are transmitted in synchronization with said AC input signal.

13. The system of claim 11, wherein said signal pulses are capacitively coupled onto said AC input signal.

14. The system of claim 11, wherein said signal pulses are DC pulses transmitted in synchronization with said AC input signal.

15. The system of claim 12, wherein said signal pulses are transmitted during predetermined portions of said AC input signal.

16. The system of claim 11, wherein said interface system is further adapted to transmit a data signal to said controller, the data signal representative of data to be stored in said electronic module.

17. The system of claim 16, wherein said controller is further adapted to interpret the data signal and store the data in said electronic module.

18. A method for bidirectionally communicating information to and from a power tool having an internally disposed storage module and controller, said method comprising:
- a) applying an input signal from a subsystem independent of said power tool through a power cord of said tool, said input signal informing said controller to enter a communications mode of operation;
- b) causing said input signal to have a frequency higher than 60 Hz and a power that is insufficient to cause normal operation of said tool;
- c) using said controller to receive said input signal and to initiate downloading of stored information from said module over said power cord via signal pulses generated in synchronization with said input signal; and
- d) demodulating said signal pulses to obtain said stored information.

19. The method of claim 18, wherein using said controller to receive said input signal and to initiate downloading of stored information comprises causing said controller to generate pulses that are synchronized in frequency with said input signal.

20. The method of claim 19, wherein causing said input signal to have a frequency higher than 60 Hz comprises causing said input signal to form an AC input signal; and
- using said controller to receive said input signal and to initiate downloading of stored information comprises causing said controller to generate pulses that are applied during positive portions of said input signal, wherein said interface system decodes said periodic pulses to obtain said operational information.

21. The method of claim 18, wherein using said controller to receive said input signal and to initiate downloading of stored information comprises using the controller to control a switch disposed within said tool to generate said signal pulses.

22. A system for fully duplexed bidirectional communication with a power tool, said system comprising:
- an electronic component disposed within the power tool, the electronic component comprising a storage module, a controller in communication with the storage module and an electrical switching device;
- an independent interface subsystem adapted to:
  - be electrically connected to a power cord of the power tool for fully duplexed bidirectional communication with the power tool;
  - to transmit a square wave, bipolar DC signal to the electronic component,
  - determine the polarity of the electronic component; and
  - digitally transmit data to the electronic component by sequentially switching the bipolar square wave, DC signal at a specific frequency using a specific communications protocol and baud rate; and
- wherein the electronic component is adapted to interpret the digitally communicated data from the interface system and transmit digital data to the interface subsystem by sequentially controlling the flow of current through the electronic switching device.

23. The system of claim 22, wherein the interface subsystem is further adapted to switch the bipolar square wave, DC signal at approximately 100 Hz using an RS232 communications protocol to thereby digitally transmit data from the interface subsystem.

24. The system of claim 22, wherein the interface subsystem is further adapted to generate a two character transmission during two of a plurality of communication periods of the bipolar square wave, DC signal to determine the polarity of the electronic component.

25. The system of claim 22, wherein the controller is further adapted to sequentially operate the electronic switching device to control the current therethrough and transmit the digital data to the interface subsystem.

26. The system of claim 25, wherein the controller is further adapted to transmit a digital '1' to the interface subsystem by maintaining the switching device in an open position during one of a plurality of conduction periods of the square wave, bipolar DC signal.

27. The system of claim 25, wherein the controller is further adapted to transmit a digital '0' to the interface subsystem by closing the switching device during one of the conduction periods of the square wave, bipolar DC signal.

28. The system of claim 22, wherein the electronic component is further adapted to store the digitally communicated data in the storage device.

29. The system of claim 22, wherein the square wave, bipolar DC signal has a peak-to-peak amplitude sufficient to sustain operation of the electronic component and insufficient to cause a motor of the power tool to rotate during communication with the interface subsystem.

30. The system of claim 29, wherein the square wave, bipolar DC signal has a peak-to-peak amplitude of approximately plus and minus 96 Volts.

31. The system of claim 29, wherein the square wave, bipolar DC signal has a peak-to-peak amplitude of approximately plus and minus 192 Volts.

32. The system of claim 22, wherein the interface subsystem is further adapted to initiate communication with the electronic component by providing power to the electronic component sufficient for the electronic component to operate and insufficient for the tool to operate, thereby.

33. The system of claim 22, wherein the interface subsystem includes an AC bypass component adapted to allow power input to the interface subsystem to bypass communications circuitry within the interface subsystem and thereby provide power to the power tool sufficient for the tool to operate.

34. The system of claim 22, wherein the specific communications protocol is adapted to reduce corruption of the data stored in the storage module.

35. The system of claim 34, wherein the specific communications protocol is further adapted to require a specific sequence of characters having a specific timing be sent by the interface subsystem to the electronic component in order for communication between the interface subsystem and the electronic component to occur.

36. A method for bidirectionally communicating with a power tool, said method comprising:
 disposing an electronic component within the power tool, the electronic component including a storage module and a controller in communication with the storage module and an electrical switching device;
 electrically connect an independent interface subsystem to a power cord of the power tool to implement fully duplexed bidirectional communication with the power tool;
 transmiting a square wave, bipolar DC signal from the interface subsystem to the electronic component;
 determining the polarity of the electronic component utilizing the interface subsystem;
 digitally transmitting data from the interface subsystem to the electronic component by sequentially switching the bipolar square wave, DC signal at a specific frequency using a specific communications protocol and baud rate;
 interpreting the digitally communicated data from the interface system utilizing the electronic component; and
 transmitting digital data from the electronic component to the interface subsystem by sequentially controlling the flow of current through the electronic switching device.

37. The method of claim 36, wherein digitally transmitting data from the interface subsystem comprises sequentially switching the bipolar square wave, DC signal at approximately 100 Hz using an RS232 communications protocol.

38. The method of claim 36, wherein determining the polarity of the electronic component comprises generating a two character transmission during two of a plurality of communication periods of the bipolar square wave, DC signal.

39. The method of claim 36, wherein transmitting the digital data to the interface subsystem comprises sequentially operating the electronic switching device to control the current therethrough.

40. The method of claim 39, wherein sequentially operating the electronic switching device comprises maintaining the switching device in an open position during one of a plurality of conduction periods of the square wave, bipolar DC signal to transmit a digital '1' to the interface subsystem.

41. The method of claim 39, wherein sequentially operating the electronic switching device comprises closing the switching device during one of the conduction periods of the square wave, bipolar DC signal to transmit a digital '0' to the interface subsystem.

42. The method of claim 36, wherein the method further comprises storing the digitally communicated data in the storage device.

43. The method of claim 36, wherein transmitting a square wave, bipolar DC signal comprises transmitting the square wave, bipolar DC signal having a peak-to-peak amplitude sufficient to sustain operation of the electronic component and insufficient to cause a motor of the power tool to rotate during communication with the interface subsystem.

44. The method of claim 43, wherein transmitting a square wave, bipolar DC signal comprises transmitting the square wave, bipolar DC signal having a peak-to-peak amplitude of approximately plus and minus 96 Volts.

45. The method of claim 43, wherein transmitting a square wave, bipolar DC signal comprises transmitting the square wave, bipolar DC signal having a peak-to-peak amplitude of approximately plus and minus 192 Volts.

46. The method of claim 36, wherein the method further comprises initiating communication with the electronic component by utilizing the interface subsystem to provide power to the electronic component sufficient for the electronic component to operate and insufficient for the tool to operate.

47. The method of claim 36, wherein the method further comprises allowing power input to the interface subsystem to bypass communications circuitry within the interface subsystem and thereby provide power to the power tool sufficient for the tool to operate.

48. The method of claim 36, wherein digitally transmitting data comprises requiring a specific sequence of characters having a specific timing be sent by the interface subsystem to the electronic component in order for communication between the interface subsystem and the electronic component to occur, thereby reducing corruption of the data stored in the storage module.

* * * * *